United States Patent
Campagna

(10) Patent No.: US 12,003,637 B1
(45) Date of Patent: *Jun. 4, 2024

(54) SECURE INITIALIZATION VECTOR GENERATION

(71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,951

(22) Filed: Jul. 17, 2023

Related U.S. Application Data

(63) Continuation of application No. 17/194,996, filed on Mar. 8, 2021, now Pat. No. 11,748,492, which is a
(Continued)

(51) Int. Cl.
*H04L 29/06* (2006.01)
*G06F 21/60* (2013.01)
*H04L 9/06* (2006.01)
*H04L 9/08* (2006.01)
*H04L 9/14* (2006.01)
*H04L 9/16* (2006.01)
(Continued)

(52) U.S. Cl.
CPC ............. *H04L 9/16* (2013.01); *G06F 21/602* (2013.01); *H04L 9/0618* (2013.01); *H04L 9/0637* (2013.01); *H04L 9/0816* (2013.01); *H04L 9/14* (2013.01); *H04L 9/3239* (2013.01); *H04L 9/3242* (2013.01); *H04L 63/06* (2013.01); *H04L 9/0643* (2013.01); *H04L 9/30* (2013.01); *H04L 63/0428* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 5,560,008 | A | 9/1996 | Johnson et al. |
| 6,055,316 | A | 4/2000 | Perlman et al. |
| | | (Continued) | |

OTHER PUBLICATIONS

"Initialization Vector", Source: https://en.wikipedia.org/wiki/Initialization_vector?, 4 pages, No Date.
(Continued)

*Primary Examiner* — Andrew J Steinle
(74) *Attorney, Agent, or Firm* — Nicholson De Vos Webster & Elliott LLP

(57) ABSTRACT

A plaintext and cryptographic key are used to generate an initialization vector to be used in a cryptographic algorithm, such as an encryption algorithm. In some examples, the plaintext and cryptographic key are input into an effectively one-way function, such as a cryptographic hash function, the output of which is usable as an initialization vector. Cryptographic keys may be rotated probabilistically based at least in part on probabilities of output collisions of the effectively one-way function to ensure a low probability of two different plaintexts resulting in calculation of the same initialization vector for use with the same cryptographic key.

20 Claims, 6 Drawing Sheets

Related U.S. Application Data continuation of application No. 15/898,505, filed on Feb. 17, 2018, now Pat. No. 10,972,270, which is a continuation of application No. 15/225,725, filed on Aug. 1, 2016, now Pat. No. 9,900,153, which is a continuation of application No. 14/225,243, filed on Mar. 25, 2014, now Pat. No. 9,407,437.

(51) Int. Cl.
*H04L 9/32* (2006.01)
*H04L 9/40* (2022.01)
*H04L 9/30* (2006.01)

(56) References Cited

U.S. PATENT DOCUMENTS

| | | | |
|---|---|---|---|
| 6,092,196 A | 7/2000 | Reiche | |
| 6,668,322 B1 | 12/2003 | Wood et al. | |
| 7,392,384 B2 | 6/2008 | Hopkins et al. | |
| 8,218,759 B2* | 7/2012 | Moffat | H04L 9/0643 380/37 |
| 2005/0094805 A1 | 5/2005 | Kitani et al. | |
| 2005/0188216 A1 | 8/2005 | Crispin et al. | |
| 2006/0023875 A1* | 2/2006 | Graunke | H04L 9/065 380/28 |
| 2006/0195402 A1 | 8/2006 | Malina et al. | |
| 2008/0307219 A1 | 12/2008 | Karandikar | |
| 2009/0034715 A1* | 2/2009 | Ramasamy | H04L 9/0637 380/28 |
| 2009/0147950 A1 | 6/2009 | Yoon | |
| 2010/0169645 A1* | 7/2010 | McGrew | H04L 9/0637 380/268 |
| 2010/0268960 A1* | 10/2010 | Moffat | H04L 9/0643 713/181 |
| 2011/0238989 A1 | 9/2011 | Machani et al. | |
| 2012/0087493 A1 | 4/2012 | Chidambaram et al. | |
| 2013/0177155 A1 | 7/2013 | Akhavan-Toyserkani et al. | |
| 2014/0173705 A1 | 6/2014 | Manning | |
| 2014/0211938 A1 | 7/2014 | Campagna | |
| 2015/0256898 A1 | 9/2015 | Morton et al. | |
| 2015/0326395 A1 | 11/2015 | Lemke et al. | |
| 2018/0129860 A1 | 5/2018 | Krishnapura et al. | |

OTHER PUBLICATIONS

"Initialization Vector," Wikipedia, the free encyclopedia. 4 pages. Undated. Retrieved from <https://en.wikipedia.org/w/index.php?title=Initialization_vector&oldid=690109963>.

Dang, Q., "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

Ex Parte Quayle Action, U.S. Appl. No. 15/225,725, dated Jul. 14, 2017, 6 pages.

Final Office Action, U.S. Appl. No. 15/898,505, dated Sep. 1, 2020, 13 pages.

NIST, "Implementation Guidance for FIPS PUB 140-1 and the Cryptographic Module Validation Program," Jan. 10, 2002, 63 pages.

NIST, "Implementation Guidance for FIPS PUB 140-2 and the Cryptographic Module Validation Program," Initial Release Mar. 28, 2003, 205 pages.

Non-Final Office Action, U.S. Appl. No. 14/225,243, dated Nov. 17, 2015, 9 pages.

Non-Final Office Action, U.S. Appl. No. 15/898,505, dated Feb. 24, 2020, 21 pages.

Non-Final Office Action, U.S. Appl. No. 15/898,505, dated Jul. 11, 2019, 7 pages.

Notice of Allowance, U.S. Appl. No. 14/225,243, dated Mar. 28, 2016, 8 pages.

Notice of Allowance, U.S. Appl. No. 15/225,725, dated Oct. 12, 2017, 7 pages.

Notice of Allowance, U.S. Appl. No. 15/898,505, dated Dec. 15, 2020, 8 pages.

Notice of Allowance, U.S. Appl. No. 17/194,996, dated Apr. 24, 2023, 10 pages.

Pornin, T., "Deterministic usage of the digital signature Algorithm (DSA) and Elliptic Curve Digital Signature Algorithm (ECDSA)," Independent Submission, Aug. 2013, ISSN: 2070-1721.

* cited by examiner

SECURE INITIALIZATION VECTOR GENERATION

CROSS REFERENCE TO RELATED APPLICATIONS

This application is a continuation of U.S. patent application Ser. No. 17/194,996, filed Mar. 8, 2021, entitled "SECURE INITIALIZATION VECTOR GENERATION," which is a continuation of U.S. patent application Ser. No. 15/898,505, filed Feb. 17, 2018, now U.S. Pat. No. 10,972,270, entitled "SECURE INITIALIZATION VECTOR GENERATION," which is a continuation of U.S. patent application Ser. No. 15/225,725, filed Aug. 1, 2016, now U.S. Pat. No. 9,900,153, entitled "SECURE INITIALIZATION VECTOR GENERATION," which is a continuation of U.S. patent application Ser. No. 14/225,243, filed Mar. 25, 2014, now U.S. Pat. No. 9,407,437, entitled "SECURE INITIALIZATION VECTOR GENERATION," the contents of which are incorporated herein by reference in their entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many cryptographic algorithms require a unique initialization vector (referred to as a starting variable or nonce, in some contexts) with every call to the cryptographic primitive under the same key. Use of the same initialization vector and key combination on different plaintexts (input to the cryptographic algorithm) may reveal information about the plaintext that can aid in a cryptographic attack. Such effects are often exacerbated when an attacker has access to one of the plaintexts. Preventing the same initialization vector/key pair from being used on multiple plaintexts, however, presents numerous challenges including, but not limited to, a substantial amount of computing resources (processing capacity, memory, etc.) being utilized for this purpose. Such challenges become even more difficult in distributed systems where multiple devices in the system may utilize the same cryptographic key.

BRIEF DESCRIPTION OF THE DRAWINGS

Various embodiments in accordance with the present disclosure will be described with reference to the drawings, in which.

DETAILED DESCRIPTION

Figure 1:
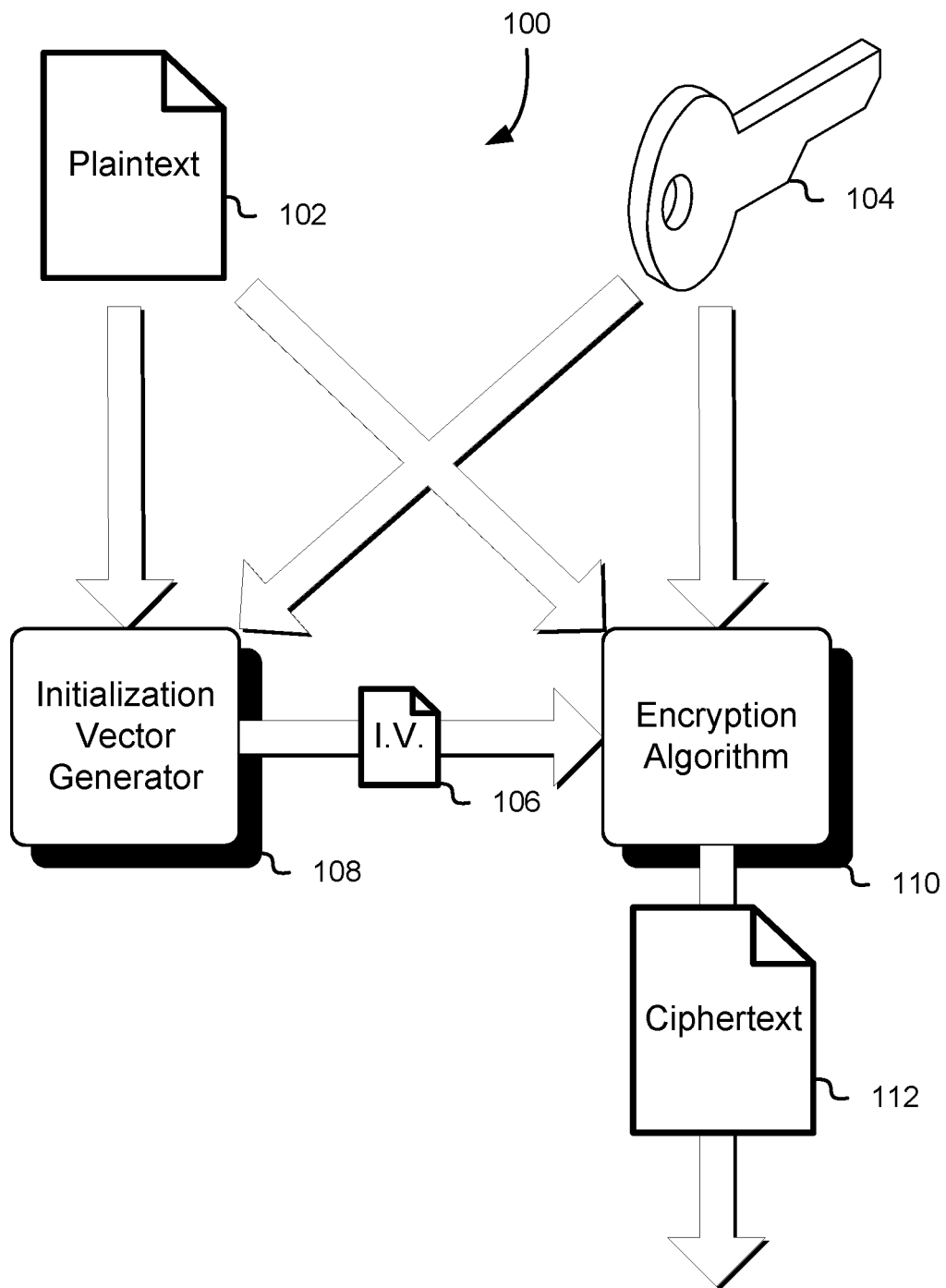
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for securely generating initialization vectors for use in cryptographic algorithms, such as encryption algorithms. In various embodiments, a cryptographic algorithm uses a plaintext, a cryptographic key, and an initialization vector. The cryptographic algorithm may be used, for example, to encrypt the plaintext using the cryptographic key. In some examples, the cryptographic key and the plaintext are used as input into an initialization vector generation algorithm used to generate an initialization vector. The initialization vector is then used along with the cryptographic key to encrypt the plaintext.

The cryptographic key and/or plaintext may be used to generate the initialization vector in various ways in accordance with various embodiments. In some examples, the plaintext and the cryptographic key are used as inputs into an effectively one-way function (which may be referred to as simply a one-way function or secure randomization function), where an effectively one-way function is a function that may not have been mathematically proven as one-way, but which has computational complexity properties that render the function pre-image resistant. Example one-way functions are discussed in more detail below. The output of the effectively one-way function, in this example, is used as the initialization vector into a cryptographic algorithm (e.g., encryption algorithm) that utilizes the plaintext, the cryptographic key and the initialization vector to generate output of the cryptographic algorithm (e.g., ciphertext). As discussed in more detail below, variations are considered as being within the scope of the present disclosure. For example, an initialization vector may be otherwise based at least in part on a plaintext and cryptographic key, such as by utilizing an incomplete portion of the plaintext and/or cryptographic key as input into an effectively one-way function and/or transforming the output of the effectively one-way function. Other inputs, such as additional authenticated data (AAD) for an authenticated encryption mode may also be used to generate the initialization vector.

In this manner, because initialization vectors are based at least in part on the output of an effectively one-way function applied to the plaintext and the key, it is very unlikely that different plaintext/cryptographic key pairs will result in the same initialization vector. As a result, cryptographic keys may be used for longer amounts of time before rotation while maintaining the same level of data security. Accordingly, various embodiments of the present disclosure include techniques for rotating cryptographic keys (i.e., replacing cryptographic keys with new cryptographic keys) that take into account the advantages of the techniques described above and described in more detail below. For example, in some embodiments, key-use logs are processed to determine how many cryptographic operations (e.g., encryptions) were performed using a cryptographic key. The particular technique used to generate the initialization vectors for the cryptographic operations may be used to determine a threshold number of cryptographic operations to determine, based at least in part on the threshold and the number of cryptographic operations performed, whether to rotate the cryptographic key. The cryptographic key may then be rotated when appropriate to maintain data security.

FIG. 1 shows an illustrative example of a diagram 100 illustrating various techniques of the present disclosure. In FIG. 1, as discussed above, the diagram 100 illustrates plaintext 102 and a cryptographic key 104 being used to generate an initialization vector 106 (abbreviated as I.V. in the figure). The initialization vector 106, in an embodiment, is generated by an initialization vector generator 108 which may be a computing system process, program, application, service, module or a combination of these and/or other such computing system entities. The initialization vector generator may be running directly on a computing system host, or may be running within a virtual machine (VM) on a computing system host or may be running on some other combination of physical and/or virtual computing systems. The initialization vector generator may operate as a distributed and/or cooperative process, program, application, service, module, and/or combination of these, and/or other such computing system entities within a distributed or non-distributed computing system environment. Elements of the initialization vector generator may operate within a computing service resource provider (or remote) datacenter location, within a customer provided (or local) datacenter location, within a combination of local and remote datacenter locations or within a combination of these and/or other such datacenter locations.

In an embodiment, the initialization vector generator 108 generates the initialization vector 106 which is input, along with the plaintext 102, into an encryption algorithm 110. The encryption algorithm 110 may be operated by the same computing system entity that implements the initialization vector generator 108 or a different computing system entity such as a different process, program, application, service, module or a combination of these and/or other such computing system entities. The encryption algorithm 110 uses the initialization vector 106 produced by the initialization vector generator 108 and produces output which, in this example, is ciphertext 112 (i.e., the plaintext 102 in encrypted form). The ciphertext may be utilized in various ways in accordance with various embodiments. For example, the ciphertext can be used to persistently store data such that, access to the ciphertext does not itself provide access to the plaintext without access to the cryptographic key 104, to transmit data over a network or in other ways. It should be noted that, while not illustrated as such, the initialization vector 106 may be managed with the ciphertext 112. For example, if the ciphertext 112 is persistently stored, the ciphertext 112 may be stored with the initialization vector 106 so that, to decrypt the ciphertext 112 to obtain the plaintext 102, only access to the cryptographic key 104 is necessary. Similarly, if the ciphertext 112 is transmitted over a network, it may be transmitted with the initialization vector 106 so that a recipient of the ciphertext 112 is able to decrypt the ciphertext 112 if that recipient has or gets access to the cryptographic key 104.

Figure 2:
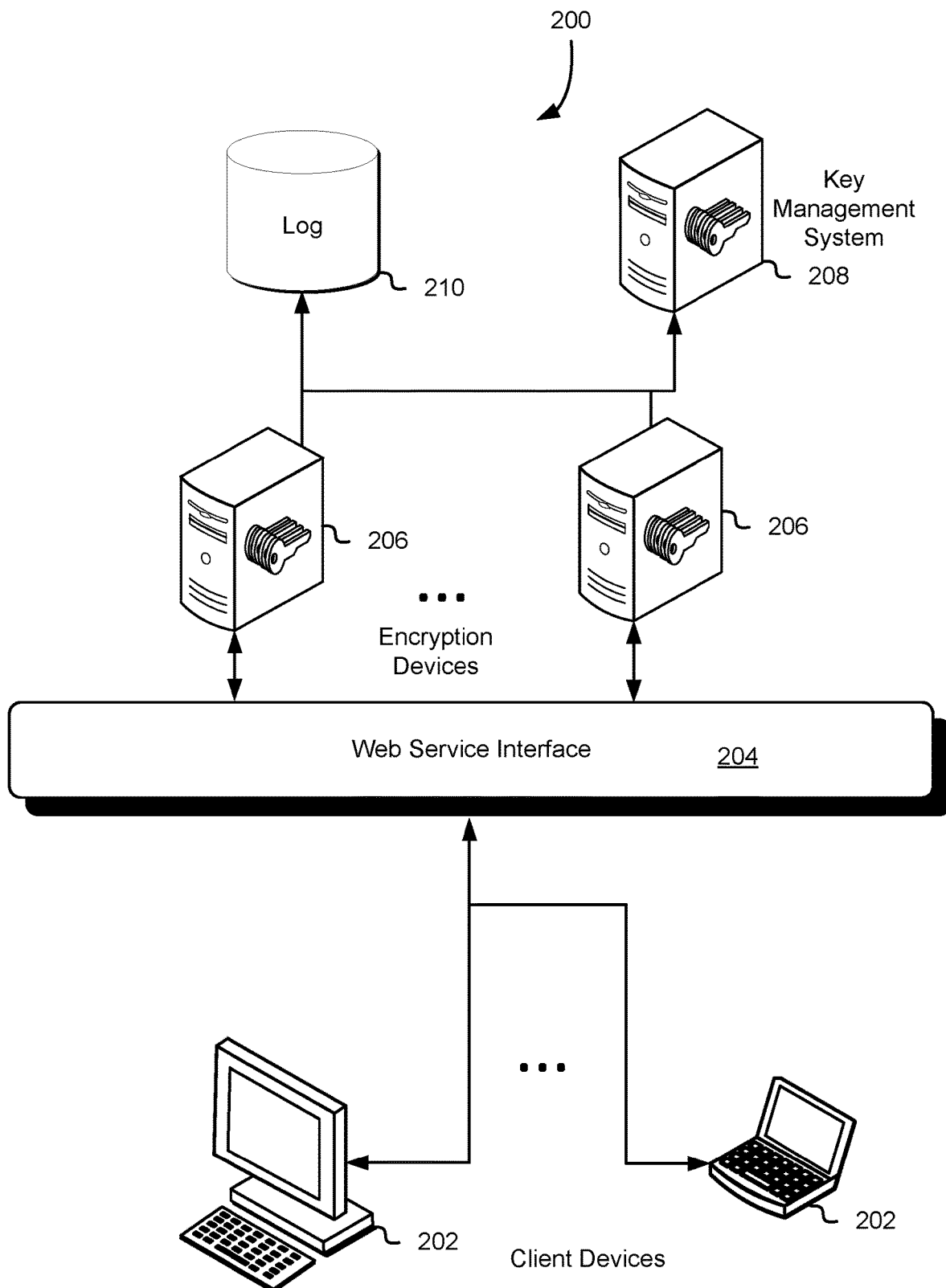
FIG. 2 shows an illustrative example of an environment in which various embodiments can be practiced.

FIG. 2 shows an illustrative example of an environment in which various embodiments can be practiced. In an embodiment, the environment 200 includes client devices 202 that communicate with a service provider through a web service interface 204. The service provider may be an entity that operates a computer system (e.g., a distributed computer system) that is configured to provide one or more services. It should be noted that the service provider computer system may also be referred to as simply "the service provider" where confusion between the entity and the computer system is unlikely. An example service provider is a computing resources service provider that provides infrastructure-as-a-service (IaaS), platform-as-a-service (PaaS), and/or software-as-a-service (SaaS) services to customers, although the techniques described herein are usable in other contexts, such as in connection with different types of service providers or, generally, in computing environments where cryptographic keys are utilized to perform cryptographic operations. It should be noted that, for the purpose of clarity, various components of offering a service are omitted from the figure and that a service provider system may include numerous devices, subsystems and the like that are not illustrated in the figure.

In an embodiment, as illustrated in FIG. 2, the service provider system includes a plurality of encryption devices 206. The encryption devices may be devices (physical or virtual) configured to perform encryption operations although, as noted above, the techniques described herein are usable for any type of cryptographic operation that utilizes initialization vectors. The encryption devices 206 may be any computing devices that are configured to perform encryption, such as hardware security modules (HSMs), trusted platform modules (TPMs), other cryptographic modules, general purpose computer systems configured to implement one or more cryptographic algorithms including an encryption algorithm and other devices. Each encryption device may utilize one or more cryptographic keys, as illustrated by the key symbols on the icons representative of the encryption devices 206. The cryptographic keys utilized by each encryption device 206 may be the same among the encryption devices 206 or the sets of cryptographic keys utilized by the encryption devices 206 may vary among the encryption devices 206 and the varying sets may be disjoint and/or overlapping (i.e., some may be disjoint and some may overlap). Further, while "encryption devices" is used for the purpose of illustration, the encryption devices 206 may perform other cryptographic operations, such as decryption, digital signature generation and/or verification, random number generation, cryptographic hash generation, and/or the like.

The cryptographic keys utilized by the encryption devices may be managed by a key management system 208, which may be a computing system process, program, application, service, module or a combination of these and/or other such computing system entities. The key management system 208 may be configured to perform various tasks, such as coordination of the rotation of cryptographic keys utilized by the encryption devices 206, determination of when to rotate cryptographic keys, secure transfer of cryptographic keys to encryption devices 206, secure generation of cryptographic keys, and/or other operations.

In some embodiments, the key management system 208 obtains key use logs from a log 210. The log 210 may be a computer system configured to operate a data store that stores information about use of cryptographic keys by the encryption devices 206. The encryption devices may report key use statistics (e.g., comprising an identifier of a cryptographic key and a number of cryptographic operations (e.g., encryptions) performed using the cryptographic key and other information, for each of a set of cryptographic keys). Such reports may be made on a period (e.g., daily) and/or aperiodic basis. The key management system 208 or another system may process the logs stored in the log 210 to determine when to rotate cryptographic keys utilized by the encryption devices 206. When determined to rotate one or more cryptographic keys, the key management system 208 may perform one or more operations to cause the rotation to occur, such as by securely transferring cryptographic keys to each encryption device that utilizes the cryptographic key. Secure transfer may, for instance, be made using a key exchange protocol which may involve encrypting a key for transfer to an encryption device 206 that is configured to encrypt the encrypted key.

Figure 3:
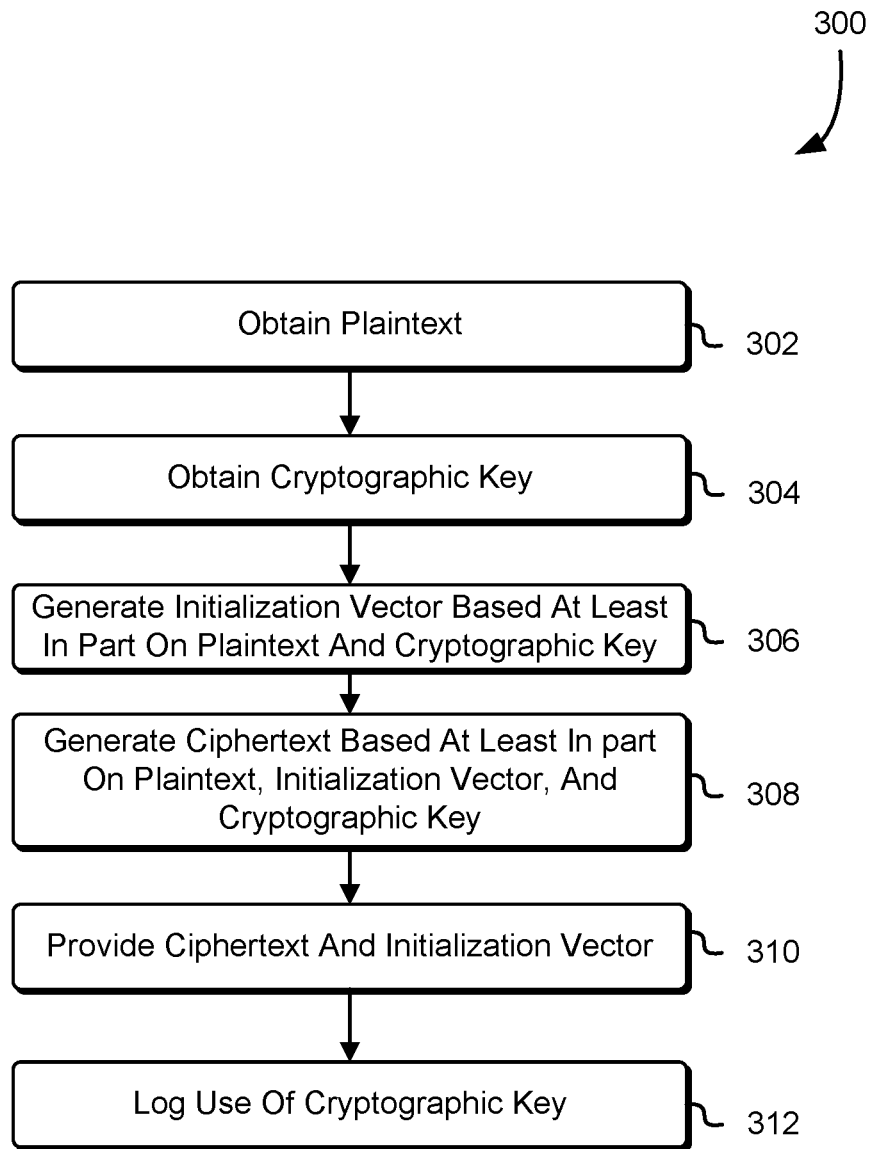
FIG. 3 shows an illustrative example of a process for performing cryptographic operations in accordance with at least one embodiment.

FIG. 3 shows an illustrative example of a process 300 for performing encryption in accordance with various embodiments. The process 300 may be performed by any suitable system, such as a computer system (whether a single device or a distributed system) configured to implement an initialization vector generator and encryption algorithm, such as described above. In an embodiment, the process 300 includes obtaining 302 plaintext. The plaintext may be obtained in various ways in accordance with various embodiments. For example, the plaintext may be provided through an application programming interface call to the web service interface discussed above in connection with FIG. 2. Generally, the plaintext may be obtained 302 in any manner, such as in a command or other communication to a system performing the process 300. The plaintext may be any data. In some examples, the plaintext is content (e.g., text, video, audio and/or other types of content). In other examples, the plaintext itself is a cryptographic key, such as a cryptographic key generated for the purpose of encrypting one or more instances of content.

In an embodiment, the process 300 includes obtaining 304 a cryptographic key. The cryptographic key may be obtained 304 in any suitable manner, such as by generating the cryptographic key, accessing the cryptographic key from data storage (e.g., reading the cryptographic key from memory or requesting and receiving the cryptographic key from another system. The cryptographic key may be a sequence of bits sufficient for the encryption algorithm used in performance of the process 300 and variations thereof. While FIG. 3 illustrates obtaining 302 plaintext prior to obtaining 304 the cryptographic key, variations of the process 300 considered as being within the scope of the present disclosure include variations where the cryptographic key is obtained prior to obtaining the plaintext or in parallel with obtaining the plaintext. Generally, various operations in all processes described herein may be performed in any suitable order and operations not dependent from one another may be performed in any order.

In an embodiment, the plaintext and cryptographic key are used to generate 306 an initialization vector, such as described above. For example, as discussed, the plaintext and cryptographic key may be input into an effectively one-way function, the output of which can be used as the initialization vector or the initialization vector can be otherwise based at least in part on the output of the effectively one-way function. Effectively one-way functions include, but are not limited to, cryptographic hash functions such as message authentication codes, (e.g., hash based message authentication code (HMAC)), key derivation functions, such as PBKDF2, and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

In other examples, data in addition to the plaintext and (if utilized) cryptographic key to generate an initialization vector. In some embodiments, for instance, an authentication encryption mode of a cryptographic cipher are used for encryption. In such embodiments, additional authenticated data (AAD) may be used as additional input into the effectively one-way function to generate the initialization vector. For example, the AAD may be appended to the plaintext or, in another example, output of an effectively one-way function may be used with the AAD as input into the same or a different effectively one-way function (thereby resulting in a composite effectively one-way function with inputs comprising the plaintext, cryptographic key and AAD). Other variations are also considered as being within the scope of the present disclosure. In embodiments where authenticated encryption modes are used, the output of an encryption algorithm may further comprise a message authentication code or other authentication information usable to validate the integrity/authenticity of the plaintext.

Once the initialization vector has been generated 306, the plaintext, cryptographic key, and generated initialization vector can be used by an encryption algorithm to generate 308 ciphertext. The encryption algorithm can be any encryption algorithm that utilizes initialization vectors in its implementation. Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. While explicit examples are given herein, the techniques described herein are usable with any cryptographic algorithm that utilizes initialization vectors. Any suitable block cipher may be used including, but not limited to, the Digital Encryption Standard (DES), and variations thereof, such as Triple DES, the International Data Encryption Algorithm (IDEA), RCS, the Advanced Encryption Standard, Twofish, and Blowfish.

Additional operations may also be performed as part of the process 300. For example, as illustrated in FIG. 3, the ciphertext may be provided 310, such as to a requestor that, as a result of requesting encryption, caused performance of the process 300 to be initiated. Further, the user of the cryptographic key for encryption may be logged 312, such as by recording (e.g., incrementing a counter) in a local data store or transmitting a notification of the cryptographic operation to another system that logs cryptographic key use.

As noted, numerous variations are considered as being within the scope of the present disclosure. For example, some of one or both of the plaintext and cryptographic key may be used as input into the effectively one-way function to generate the initialization vector. For example, the cryptographic key may be M, where M is a positive integer. The first K bits of the cryptographic key may be used, along with some or all of the plaintext, to generate the initialization vector while the last L bits may be used for encryption, where K and L are positive integers. In some embodiments, M=K+L, although not necessarily. The value of K+L may be greater than or less than M. Generally, a first subset of bits of the cryptographic key (which are not necessarily sequential) may be used for generation of the initialization vector and a second subset of the bits of the cryptographic key may be used for encryption. One or both of the first subset and the second subset may be a proper subset of the set of bits that comprise the cryptographic key. Further, the first subset and second subset may be disjoint subsets or may have a nonempty intersection. The set of bits comprising the cryptographic key may or may not consist of the union of the first subset and second subset. In some embodiments, a first cryptographic key may be used for initialization vector generation and a second cryptographic key may be used for encryption. In such embodiments, referring to the narrative above, it may be said that the cryptographic key (used for both initialization vector generation and encryption) comprises the first cryptographic key and the second cryptographic key, even though the first cryptographic key and the second cryptographic key may be stored in separate data objects.

Figure 4:
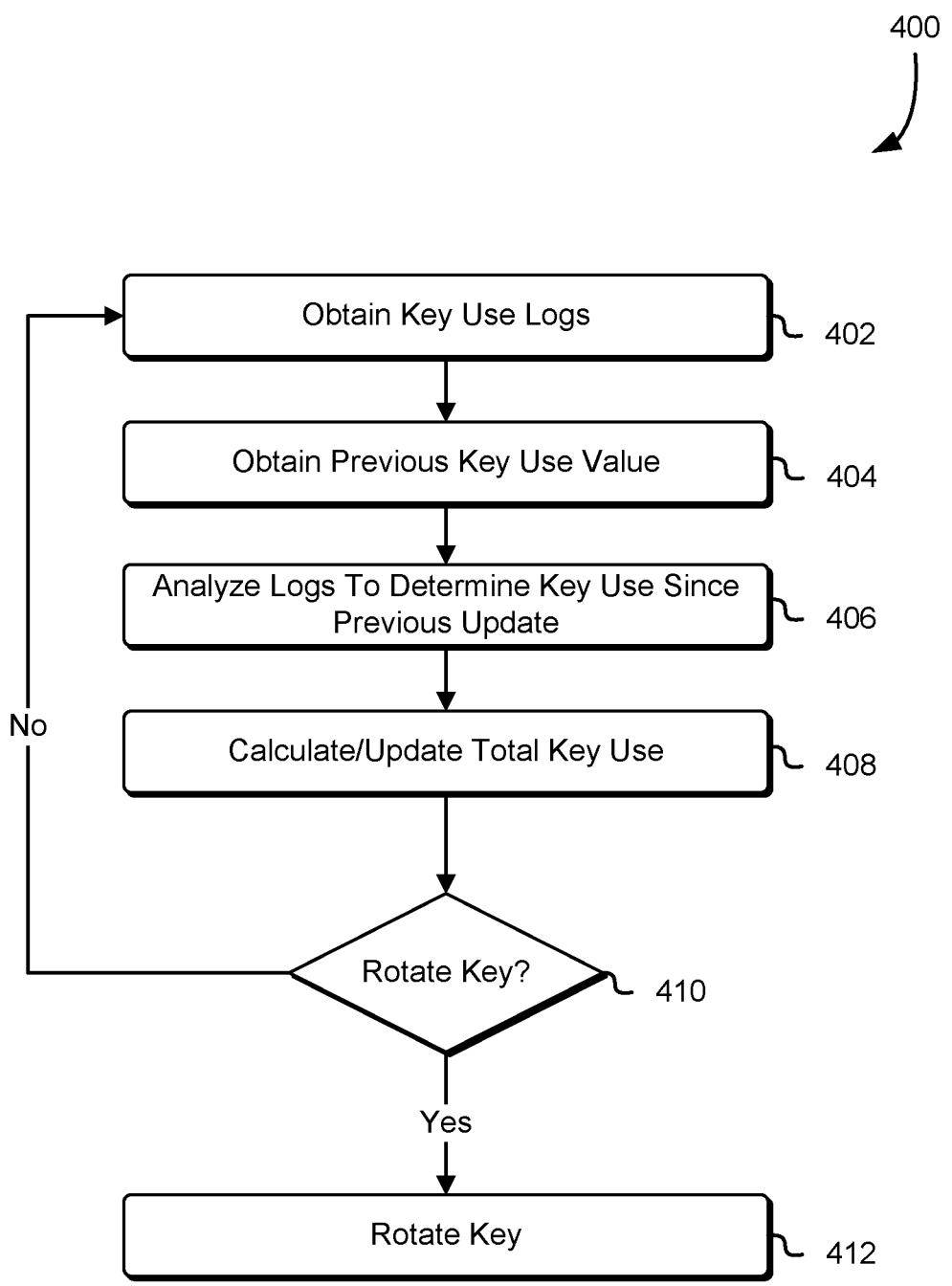
FIG. 4 shows an illustrative example of a process for managing cryptographic key lifetimes in accordance with at least one embodiment.

As discussed, various embodiments of the present disclosure allow for enhanced security in connection with key rotation regimes. FIG. 4, accordingly, shows an illustrative example of a process 400 for managing key rotation in accordance with an embodiment. The process 400 may be performed by any suitable system, such as by a key management system described above or any system configured with privileges to cause key rotation, which may be the same system (e.g., same device) that utilizes the cryptographic key(s) to perform cryptographic operations or a separate system. In an embodiment, the process 400 includes obtaining 402 one or more key use logs. The key use logs may be obtained in various ways in accordance with various embodiments and the ways may vary in accordance with the particular computing environment in which the process 400 is performed. For example, in some embodiments, encryption devices, such as described above, report key usage for encryption operations for an amount of time (e.g., an amount of time since a last reporting). Reports may be transmitted over a network to the system performing the process 400 or another system, such as a system that aggregates key usage statistics prior to providing to the system performing the process 400.

In the embodiment illustrated in FIG. 4, the key use logs obtained 402 from the encryption devices provide, for each cryptographic key of a set of cryptographic keys (which may have a single member or multiple members), a number of encryption operations performed since last reporting a log or, if the first such reporting, since the beginning of use of the cryptographic key. As noted, however, in alternate embodiments, an encryption device may provide a total number of encryptions performed using the cryptographic key. Generally, log reports may include additional information, such as a total number of encryptions performed, a number of encryptions performed since last reporting, statistics for other types of cryptographic operations, and/or other operations as well. Returning to the illustrated embodiment, the process 400 may include obtaining 404 a previous key use value which, in an embodiment, is a value that represents an aggregated total number of operations performed using the cryptographic key or estimate thereof if such a number is not known with certainty. The previous key use value may be accessed from memory, such as from a database configured to track key usage. The obtained 402 key use logs may be analyzed 406 to determine key usage statistics since the previous update (e.g., the previous time the process 400 was returned which may correspond to the previous time usage logs were examined). Determining the key usage statistics may, for example, include calculating a sum of individual key use numbers from each of a plurality of encryption devices whose cryptographic key activity is being tracked.

A total for the key use for the cryptographic key for which the process 400 is being performed may be calculated and updated 408, such as by writing a total usage statistic for the cryptographic key to memory. A determination may be made 410 whether to rotate the cryptographic key. The determination may be based at least in part on the total key use calculated 408. The determination may be made in various ways in accordance with various embodiments. In some examples, the total key use is compared with a threshold number of encryptions performed and, if the number exceeds the threshold, determining to rotate the key. In other examples, the determination is more complicated. For example, an average of time periods may be used to estimate a total number of encryption operations that will be performed within a future amount of time, such as an amount of time scheduled to pass before another determination whether to rotate the key is made, so that a determination to rotate is made to ensure that the estimated total number of encryptions will not exceed a threshold before the next determination is made. The average, in this example, may be calculated using exponential or other smoothing so that older time periods contribute less to the average than newer time periods. Other ways of making the determination are also considered as being within the scope of the present disclosure.

In an embodiment, the determination is made 410 to ensure that the probability of repeated use of the same initialization vector with different plaintexts is below some specified threshold. The specified threshold may be different for different cryptographic algorithms. For example, the threshold may be $$\frac{1}{2^{32}}$$

for the AES-GCM cryptographic algorithm and for other cryptographic algorithms. The probability may be determined (i.e., calculated or estimated) based at least in part on the probability of a collision (e.g., hash collision) in the effectively one-way function used to generate the initialization vector or an estimation thereof.

If determined 410 to not rotate the cryptographic key, the process 400 may repeat, such as described above until determined 410 to rotate the cryptographic key. Once determined to rotate the cryptographic key, the process 400 may include rotating 412 the cryptographic key, such as described above. For example, in a distributed system with multiple encryption devices, the process 400 may include transmitting instructions to the encryption devices that cause the encryption devices to retire (i.e., stop using) the cryptographic key and providing the encryption devices a new cryptographic key to use instead of the retired cryptographic key or otherwise causing the encryption devices to obtain the cryptographic key, such as by instructing an encryption device to generate a new cryptographic key and causing the other encryption devices to obtain the cryptographic key through a consensus protocol, such as Paxos. In some embodiments, the new cryptographic key may become associated with an identifier also associated with and/or previously associated with the former cryptographic key. Other operations may also be performed, such as by accessing and decrypting data encrypted under the former cryptographic key and re-encrypting the data using the new cryptographic key. In some embodiments, the data encrypted under the former cryptographic key is left encrypted under the former cryptographic key and the former cryptographic key is persistently stored in association with the data. If access to the data is desired, the former cryptographic key may be accessed and used for decryption.

Other variations are also considered as being within the scope of the present disclosure. For example, referring to the systems described above that calculate initialization vectors and use those initialization vectors for performing cryptographic operations, in some embodiments, the same device that calculates an initialization vector also performs the cryptographic operation using the calculated initialization vector. In other embodiments, the device that calculates the initialization vector is different from the device that uses the initialization vector to perform the cryptographic operation using the initialization vector. A device may, for instance, implement a service that generates initialization vectors as a service. In some embodiments, there is a logical division between two virtualized devices, one of which calculates an initialization vector and another of which uses the calculated initialization vector to perform a cryptographic operation. Further, as noted, variations in how initialization vectors are calculated vary in accordance with various embodiments. For instance, as noted above, initialization vectors may be generated based at least in part on plaintexts and cryptographic keys. In some embodiments, initialization vectors are calculated solely based on the plaintext or otherwise based at least in part on the plaintext, but without the cryptographic keys used to perform the cryptographic operation using the initialization vectors. The plaintext (possibly with other data different from the cryptographic key) may be input into an effectively one-way function to calculate the initialization vector. The variations described herein are intended to be for illustration and not an exhaustive list.

Figure 5:
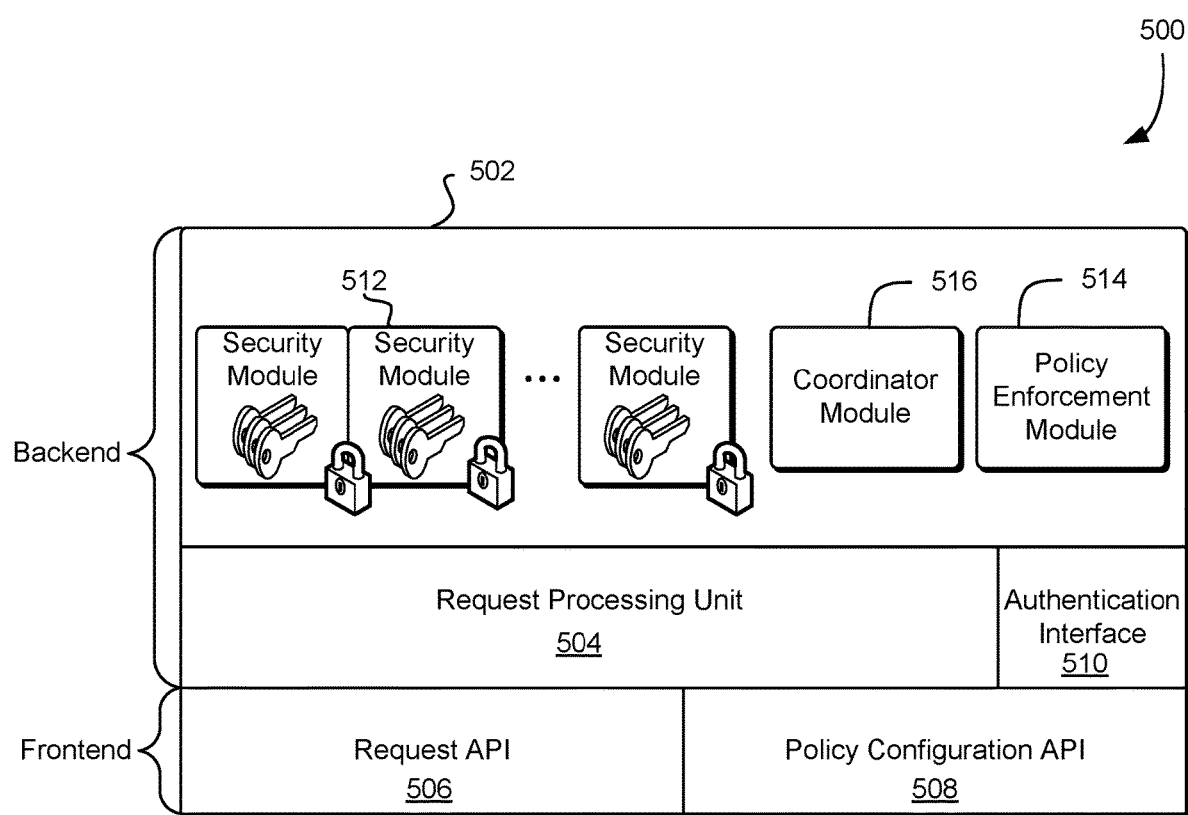
FIG. 5 shows an illustrative example of a cryptography service in accordance with at least one embodiment.

As discussed above, various embodiments of the present disclosure are directed to providing cryptography services. Cryptography services may be provided by a cryptography service system such as described above. FIG. 5 accordingly shows an illustrative example of a cryptography service 500 in accordance with various embodiments. As illustrated in FIG. 5 and as discussed above, the cryptography service 500 is logically comprised of a frontend system and a backend system. Both the frontend system and the backend system may be implemented by one or more computer systems configured to perform operations described herein. For example, as illustrated in FIG. 5, the frontend system of the cryptography service 500 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID)

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeroes or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol, or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

As illustrated in FIG. 5, the cryptography service 500 includes a backend system 502 that itself comprises various components in some embodiments. For example, the backend system in this example includes a request processing system (unit) 504 which may be a subsystem of the cryptography service 500 that is configured to perform operations in accordance with requests received through either the request API 506 or the policy configuration API 508. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 510 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 500 also, in this illustrative example, includes a plurality of a security modules 512 (cryptography modules), a policy enforcement module 514, and a coordinator module 516. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 500 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 500 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 5 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 6:
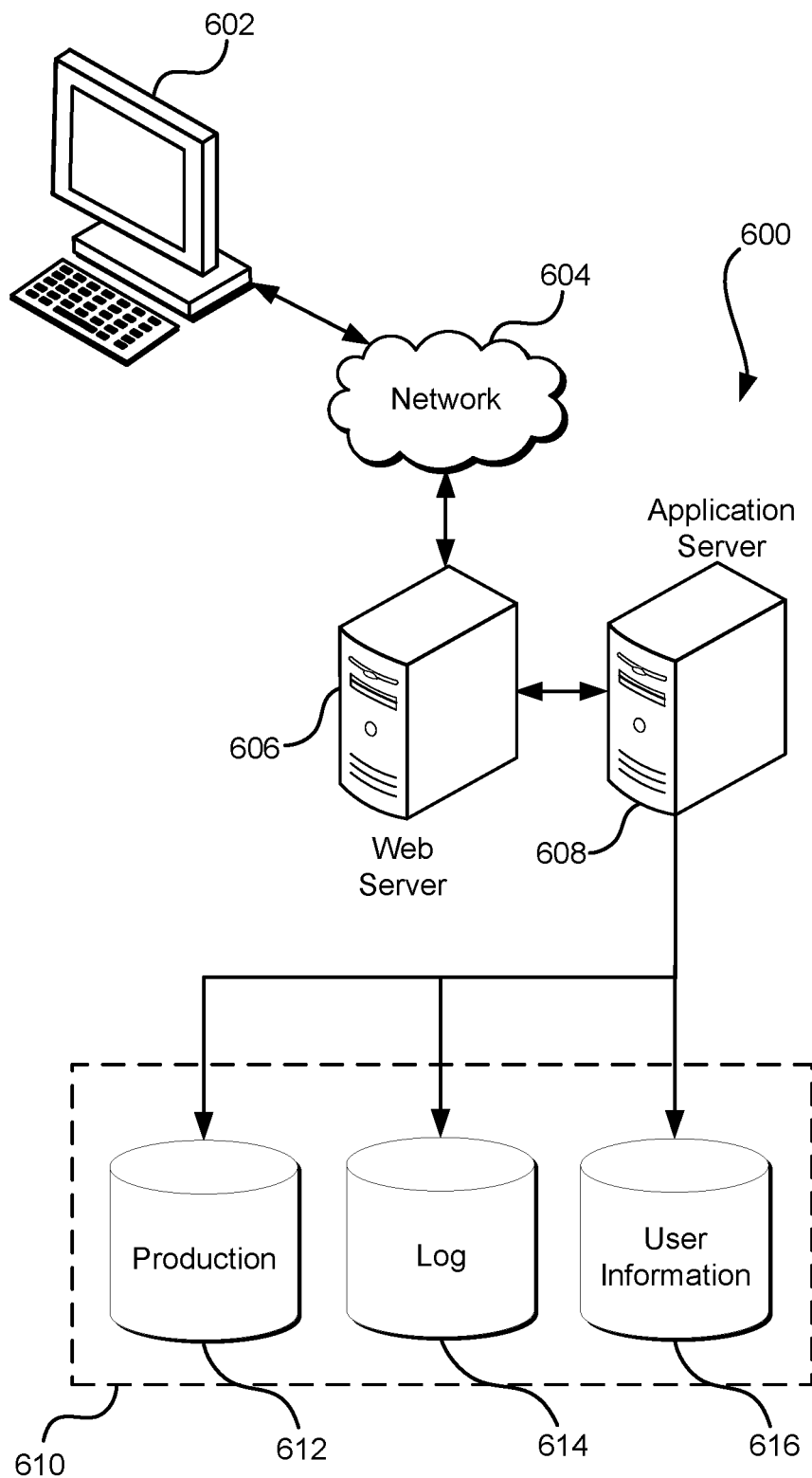
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 602 and the application server 608, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes, and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
generating, based at least in part on an amount of usage of a cryptographic key, a determination whether to replace the cryptographic key with another cryptographic key, the determination generated to comply with a condition that use of the cryptographic key in an algorithm, used by a set of devices, to generate an initialization vector based at least in part on an input plaintext and an input cryptographic key, is such that a probability of repeated use of the cryptographic key and a same initialization vector with different plaintexts is below a threshold.

2. The computer-implemented method of claim 1, wherein the algorithm generates the initialization vector based at least in part on output of a preimage-resistant function applied to function input, the function input based at least in part on the plaintext and the cryptographic key.

3. The computer-implemented method of claim 1, wherein the algorithm applies a cryptographic hash function to a set of inputs based at least in part on the plaintext and the cryptographic key.

4. The computer-implemented method of claim 1, wherein the amount of usage of the cryptographic key is an amount of encryption operations performed by the set of devices.

5. The computer-implemented method of claim 1, wherein the amount of usage of the cryptographic key is a number of encryption operations performed using the cryptographic key as the input cryptographic key for the algorithm.

6. The computer-implemented method of claim 1, wherein the set of devices comprises a plurality of devices that each use the cryptographic key to perform cryptographic operations.

7. A system, comprising one or more computing devices including one or more computer-readable storage medium storing instructions that, when executed by one or more processors of the one or more computing devices, cause the one or more computing devices to:
generate, based at least in part on an amount of usage of a cryptographic key, a determination whether to replace the cryptographic key with another cryptographic key, the determination generated to comply with a condition that use of the cryptographic key in an algorithm, used by a set of devices, to generate an initialization vector based at least in part on an input plaintext and an input cryptographic key, is such that a probability of repeated use of the cryptographic key and a same initialization vector with different plaintexts is below a threshold.

8. The system of claim 7, wherein the algorithm generates the initialization vector based at least in part on output of a preimage-resistant function applied to function input, the function input based at least in part on the plaintext and the cryptographic key.

9. The system of claim 7, wherein the one or more computing devices comprises a plurality of devices that each use the cryptographic key to perform cryptographic operations, and the amount of usage of the cryptographic key is determined based at least in part on individual usage of the cryptographic key by each of the plurality of devices.

10. The system of claim 7, wherein the usage of the cryptographic key is a number of encryption operations performed using the cryptographic key.

11. The system of claim 7, wherein the cryptographic key includes an identifier, and replacement of the cryptographic key comprises associating the other cryptographic key with the identifier.

12. The system of claim 11, wherein the system determines the amount of usage of the cryptographic key by at least aggregating usage of the cryptographic key by a plurality of other systems.

13. The system of claim 12, wherein the system aggregates the usage of the cryptographic key by processing logs generated by the plurality of other systems.

14. The system of claim 7, wherein the system further manages a plurality of cryptographic keys that includes the cryptographic key and uses individual cryptographic keys of the plurality of cryptographic keys to fulfill requests received by the system.

15. The system of claim 7, wherein the system performs the algorithm to fulfill requests to use the cryptographic key to perform cryptographic operations.

16. A non-transitory computer-readable storage medium storing executable instructions that, as a result of execution by one or more processors of a computer system, cause the computer system to at least:
generate, based at least in part on an amount of usage of a cryptographic key, a determination whether to replace the cryptographic key with another cryptographic key, the determination generated to comply with a condition that use of the cryptographic key in an algorithm, used by a set of devices, to generate an initialization vector based at least in part on an input plaintext and an input cryptographic key, is such that a probability of repeated use of the cryptographic key and a same initialization vector with different plaintexts is below a threshold.

17. The non-transitory computer-readable storage medium of claim 16, wherein the algorithm generates the initialization vector based at least in part on output of a preimage-resistant function applied to function input, the function input based at least in part on the plaintext and the cryptographic key.

18. The non-transitory computer-readable storage medium of claim 16, wherein the algorithm applies a cryptographic hash function to a set of inputs based at least in part on the plaintext and the cryptographic key.

19. The non-transitory computer-readable storage medium of claim 16, wherein the amount of usage of the cryptographic key is an amount of encryption operations performed by the set of devices.

20. The non-transitory computer-readable storage medium of claim 16, wherein the amount of usage of the cryptographic key is a number of encryption operations performed using the cryptographic key as the input cryptographic key for the algorithm.

* * * * *